Patented Oct. 31, 1950

2,527,793

UNITED STATES PATENT OFFICE 2,527,793

HOT MELT COATING COMPOSITIONS

Charles K. Bump, Hampden, and George H. Bischoff, Fort Devens, Mass., assignors to Monsanto Chemical Company, St. Louis, Mo., a corporation of Delaware No Drawing. Application February 28, 1948, Serial No. 12,133

5 Claims. (Cl. 260—23)

This invention relates to polyvinyl acetal hot melt compositions. More particularly, the invention relates to polyvinyl acetal hot melt compositions modified with silicones.

Hot melt compositions based on polyvinyl acetal resins have recently been developed for coating, impregnating and adhesive applications. They are fluid at elevated temperatures and are applied while fluid to various surfaces such as glass, paper, wood, metal, fabrics, etc. in coat or impregnate them. On cooling, the coated or impregnated material is smooth and glossy but may be sealed to other like or unlike surfaces by the application of heat and pressure. A major problem in their development has been to develop high degree of adhesiveness without rendering the surfaces tacky when cold. As a rule the compositions having superior adhesive qualities are tacky enough at ordinary temperatures so that sheets or articles impregnated therewith when stacked in piles, tend to stick together or at best cannot be easily separated by a sliding motion, i. e., the top layers must be lifted clear in order to remove them without disturbing the entire stack.

It is an object of this invention to provide improved hot melt compositions based on polyvinyl acetal resins.

A further object is to provide polyvinyl acetal hot melt compositions having high adhesive qualities together with a minimum of tackiness at ordinary temperatures.

These and other objects are attained by incorporating a liquid silicone in hot melt compositions based on polyvinyl acetal resins.

The following examples are given in illustration and are not intended to limit the scope of this invention. Where parts are mentioned, they are parts by weight.

Example I

| | Parts |
|---|---|
| Polyvinyl butyral | 100 |
| Hydrogenated castor oil | 160 |
| Stearamide | 150 |
| Ester gum | 260 |
| Butyl benzyl phthalate | 60 |
| Dimethyl silicone polymer | 5 |

All of the above ingredients were added together in a double bladed dough mixer and mixed at a temperature of about 150° C. until a thoroughly homogeneous mass was obtained. The resulting composition could be used to coat or impregnate porous materials at temperatures between 85 and 175° C. in which range the composition is fluid. The coated and impregnated materials could then be cooled to room temperatures and stacked in piles, from which individual members could be withdrawn easily by merely sliding them off the pile. Furthermore, paper coated therewith would not stick to a superimposed sheet of uncoated paper even when the sheets were heated together between metal plates at about 55° C. for about 24 hours, followed by cooling to room temperature. In addition, a stack of coated or impregnated articles such as a stack of coated paper sheets could be cut or trimmed with a hot knife without adhesion occurring at the points of contact of the knife. When paper labels were coated with the above compositions, they could be cooled to room temperature and stored for an indefinite length of time without any adhesion between superimposed labels; yet, whenever desired, the labels could be sealed to packaging materials such as cellophane, paper, etc. by the application of heat above about 85° C. and pressure to obtain a firm and permanent bond.

When the dimethyl silicone polymer was omitted from the composition of Example I, the same high degree of adhesiveness was obtained in the heat sealing operations, but the coated materials could not be stored for more than a few days at ordinary temperatures in superimposed arrangement without a definite adhesion of one article to the next. Furthermore, a stack of material coated with the unmodified composition could not be cut with a hot knife without obtaining strong adhesion between the components of the stack at the points of contact of the hot knife. And even when completely cooled to room temperature, a pile of coated sheets could not be separated without lifting each sheet from the pile. Any attempt to slide a sheet off, as is frequently done in printing and packaging machines, tended to disarrange the entire pile.

Example II

| | Parts |
|---|---|
| Polyvinyl butyral | 100 |
| Hydrogenated castor oil | 500 |
| Hydrogenated rosin | 150 |
| Dimethyl silicone polymer | 10 |

The above ingredients were thoroughly mixed at about 150° C. to obtain a homogeneous mass. It had excellent adhesive qualities at elevated temperatures but was substantially nonadhesive at ordinary temperatures. Materials coated or impregnated therewith could be superimposed and stored for extended periods of time at normal temperatures with no tendency to adhesion appearing. The stacks could be cut with a hot knife without causing adhesion between the individual articles at the point of contact with the hot knife.

Example III

| | Parts |
|---|---|
| Polyvinyl butyral | 100 |
| Hydrogenated castor oil | 400 |
| Hydrogenated rosin | 100 |
| Ester gum | 90 |
| Dimethyl silicone polymer | 10 |

The above ingredients were thoroughly mixed together at a temperature of about 150° C. until a homogeneous mass was obtained. The product could be coated on or impregnated into various porous materials such as paper, wood, fabrics, etc. without cooling or it could be cooled to room temperature and stored for extended periods of time. After storage, it could be used as desired for coating and impregnating at temperatures within the range of 85 to 175° C. at which temperatures it was fluid. The coatings showed excellent adhesion to such materials but had little tendency to block at normal temperatures. Labels coated therewith could be stacked in superimposed relationship for extended periods of time and then separated one from another by merely slipping the top label off with relatively little pressure. The labels could be heat sealed to various objects and surfaces by the application of heat and pressure thereby obtaining a firm and permanent seal.

The polyvinyl butyral resin used in the examples was one containing, on a weight basis, from 10 to 12% hydroxyl groups calculated as polyvinyl alcohol, from about 0.5 to 2% acetate groups calculated as polyvinyl acetate, and the balance butyraldehyde groups.

Other polyvinyl acetal resins may be used. They may be made by hydrolyzing a polyvinyl ester, either completely or partially, and reacting the hydrolyzed product with an aldehyde or a ketone such as formaldehyde, acetaldehyde, butyraldehyde, valeraldehyde, octaldehyde, 2-ethyl hexyl aldehyde, benzaldehyde, methyl ethyl ketone, methyl isopropyl ketone, etc., or mixtures of the same. U. S. patent to Morrison et al., Reissue 20,430, dated June 29 1937, illustrates suitable methods for preparing such resins. Polyvinyl acetal resins prepared in this manner may have a certain number of ester groups, originally present in the polyvinyl ester, which have not been removed, as well as a certain number of hydroxyl groups which have replaced ester groups and have not been replaced by acetal groups.

According to one embodiment of this invention, the polyvinyl acetal resins employed may be considered to be made up, on a weight basis, of 5-25% hydroxyl groups, calculated as polyvinyl alcohol, 0-40% ester groups, calculated as polyvinyl acetate, and the balance substantially acetal. In a preferred embodiment of this invention, the range of hydroxyl groups is restricted to 5-18%.

When the acetal is butyraldehyde acetal, according to one embodiment of this invention, the polyvinyl acetal resin contains, on a weight basis, 5-18% hydroxyl groups, calculated as polyvinyl alcohol, 0-30% acetate groups calculated as polyvinyl acetate, and the balance substantially butyraldehyde acetal.

When the acetal is formaldehyde acetal, according to another embodiment of this invention, the polyvinyl acetal resin may contain, on a weight basis, 5-8% hydroxyl groups calculated as polyvinyl alcohol, 10-16% acetate groups calculated as polyvinyl acetate and the balance substantially formaldehyde acetal.

An example of a polyvinyl acetaldehyde acetal resin is one containing, on a weight basis, 7% hydroxyl groups calculated as polyvinyl alcohol, 17% acetate groups calculated as polyvinyl acetate, and the balance substantially acetaldehyde acetal. Typical of a mixed acetal resin is one which contains, on a weight basis, 13% hydroxyl groups, calculated as polyvinyl alcohol, 2-6% acetate groups, calculated as polyvinyl acetate, and the balance acetaldehyde and butyraldehyde groups, in a molar ratio of 65-50% acetaldehyde and 35-50% butyraldehyde acetal groups.

The polyvinyl acetal resins are the basic thermoplastic materials in the hot melt compositions of this invention. In addition to the polyvinyl acetal resins, the compositions must include hydrogenated castor oil and a fluid silicone compound.

Hydrogenated castor oil is a waxy solid obtained by the complete hydrogenation of castor oil and is principally 12-hydroxy glyceryl trihydroxy stearate. It has an apparent specific gravity of 0.98-0.90 at 20° C., a melting or solidification range of 86-88° C., an acid number less than 2.0, a saponification number ranging from 175-185, an iodine number ranging from 2.5-8.5, a hydroxyl number ranging from 135-165 and an ash content of less than 0.005%.

The hydrogenated castor oil may be used in amounts ranging from about 150 to about 800 parts per 100 parts of polyvinyl acetal resin. It may be partially but not wholly replaced by other materials such as natural or synthetic waxes which are either compatible, partially compatible, or compatible only at the application temperature or above with the polyvinyl acetal resin. The hydrogenated castor oil should be present in an amount by weight at least equal to that of the material replacing it in part. Among the synthetic and natural waxes and wax-like compounds that may be used are: glyceryl monostearate, glyceryl distearate, ethylene glycol monostearate, diethylene glycol monostearate, triethylene glycol monostearate, ethylene glycol monohydroxystearate, stearic acid, oleic acid, palmitic acid, cetyl alcohol, tetradecyl alcohol, carnaubyl alcohol, stearamide, oleamide, palmitamide, paraffin wax, microcrystalline waxes, beeswax, carnauba wax, cetyl acetamide, etc.

The fluid silicone compounds which are an essential component of the compositions of this invention are organo silicon oxide polymers generally, although not altogether, of the straight chain type. The long chain polymers are not crosslinked to any substantial extent. They are prepared from silicon tetrachloride by reaction with Grignard reagents followed by hydrolysis. They are stable liquids having excellent heat stability and waterproofness. Their viscosity covers a wide range, which, along with the boiling points, appears to be controlled mostly by the length of the polymer chain. In particular, the fluid silicone polymers are generally dialkyl silicone polymers. It is possible to prepare dialkyl silicones in which two different alkyl groups are present but the most common silicone fluids are compounds in which all of the alkyl groups are the same. In a preferred embodiment of this invention, the dialkyl silicone polymers are the dimethyl silicone polymers occurring in straight chain configurations.

As a general rule, the silicone fluids are not compatible with organic plastic compositions and cannot be incorporated therein without excessive sweating out. However, it has been found that they are compatible with the compositions of this invention to the extent of at least 15 parts per 100 parts of polyvinyl acetal resins and are especially suitable for preventing blocking and increasing slippage of materials treated with the compositions of the invention without decreasing the adhesiveness of the compositions or weakening the bonds obtained therewith. The silicone fluids may be used in proportions ranging from about 1 part to about 15 parts per 100 parts of polyvinyl acetal resin.

The compositions of this invention may be further modified by the addition of natural and synthetic resins and derivatives thereof, including such materials as dammar, elemi, copal, kauri, chlorinated diphenyls, chlorinated terphenyls, chlorinated naphthalenes, aryl sulfonamide resins, pentaerythritol resins, alkyd resins, etc. A particularly useful class of modifying compounds is rosin and its derivatives including hydrogenated rosin, esters of polymerized rosin and esters of hydrogenated rosin. The amount of modifier may be varied over a range of from about 100 to about 800 parts per 100 parts of polyvinyl acetal resin.

The compositions of this invention may also be modified with organic compounds containing at least one amido or imido group such as aliphatic amides, aromatic amides, aliphatic sulfonamides, aromatic sulfonamides, N-substituted amides, amides and imides of dibasic acids, lactams, ethers of alkylol aryl sulfonamides, etc. The amido and imido compounds serve to increase the adhesive character of the compositions. They may be used in amounts varying between about 5 and about 200 parts per 100 parts of polyvinyl acetal resin.

It is often desirable to add a plasticizer for the polyvinyl acetal resin to the hot melt compositions of this invention. Any of the common plasticizers which are compatible with polyvinyl acetal resins may be used, although, it is preferred to use only those which are relatively non-volatile at the high temperatures used during the preparation and application of the compositions. Thus, dimethyl and diethyl phthalate may be used but they are only partially satisfactory since their relatively high volatility causes them to evaporate rapidly from the heated mixture. Better plasticizers are the alkyl phthalyl alkyl glycollates, such as butyl phthalyl butyl glycollate, and other high boiling materials such as butyl benzyl phthalate, diphenyl phthalate, triphenyl phosphate, tricresyl phosphate, butyl acetyl ricinoleate, etc. The amount of the plasticifier used may be varied from about 20 to about 200 parts per 100 parts of polyvinyl acetal resin.

Solvents such as toluol, cyclohexanone, isophorone, butyl acetate, the cellosolves, the carbitols, etc., may be added in small amounts to the hot melt compositions to lower the temperature at which they become fluid and promote the ease of application. The solvents are then removed by conventional drying process, such as in heated ovens.

The compositions of this invention are advantageously prepared by simply adding all of the ingredients to a suitable vessel equipped with agitating and heating means and then agitating the mass at temperatures ranging from about 135 to about 150° C. until a homogeneous mixture is obtained. Alternatively, any one or a plurality of the ingredients may be heated to the mixing temperature with agitation until fluid and the remaining ingredients then added while continuing the agitation and heating.

The compositions of this invention are fluid at temperatures ranging from 85 to 175° C. While fluid, they are tacky and may be applied to various materials such as glass, metal, paper, cellophane, cellulose acetate foils, vinyl resin foils, wood, etc., by conventional coating and impregnating technics such as dipping, roll coating, spraying, etc. The excess of the hot melt composition may then be removed by conventional means such as wiping dies, doctor blades, etc.

Pigments, fillers, dyes and other conventional additives may be added to the compositions either in the original preparation or when they have been reheated to fluidity preparatory to the coating or impregnating operation.

The hot melt compositions of this invention are characterized by excellent adhesive qualities at elevated temperatures which result in a firm and permanent bond at ordinary temperatures. Materials coated or impregnated therewith have non-tacky surfaces which permit easy sliding of the individual articles one over another. Furthermore, they are non-blocking in character. By non-blocking is meant that an article such as a sheet of coated paper could be superimposed on a sheet of uncoated paper and then placed between two metal sheets and heated at about 55° C. for about 24 hours and then cooled to room temperature without adhering to the uncoated paper. The blocking test may also be run by superimposing a plurality of coated sheets, placing the stack of sheets on a metal plate and placing a weight of from 1 to 5 lbs. on the stack. The composite is then heated for from 17 to 24 hours at 55–60° C. and finally cooled to room temperature. If the superimposed sheets may be easily pulled apart, they are non-blocking in character. By modifying the polyvinyl acetal hot melt compositions with fluid silicones, all tendency of sheets treated therewith to block is removed but the heat sealing character of the treated sheets and the strength of the bonds produced is not substantially altered.

It is obvious that many variations may be made in the products and processes of this invention without departing from the spirit and scope thereof as defined in the appended claims.

What is claimed is:

1. A hot melt composition comprising 100 parts of a polyvinyl acetal resin, from 150–800 parts of hydrogenated castor oil and from 1–15 parts of a fluid dialkyl silicone polymer.

2. A hot melt composition as in claim 1 wherein the fluid dialkyl silicone polymer is a fluid dimethyl silicone polymer.

3. A hot melt composition as in claim 1 wherein the polyvinyl acetal is a polyvinyl formaldehyde acetal.

4. A hot melt composition as in claim 1 wherein the polyvinyl acetal resin is a polyvinyl acetaldehyde acetal.

5. A hot melt composition as in claim 1 wherein the polyvinyl acetal resin is a polyvinyl butyraldehyde acetal.

CHARLES K. BUMP.
GEORGE H. BISCHOFF.

(References on following page)

REFERENCES CITED

The following references are of record in the file of this patent:

UNITED STATES PATENTS

| Number | Name | Date |
|---|---|---|
| 2,297,709 | Kauppi | Oct. 6, 1942 |
| 2,317,891 | Dennison | Apr. 25, 1943 |
| 2,348,756 | Ryan | May 16, 1944 |
| 2,398,187 | McGregor et al. | Apr. 9, 1946 |
| 2,442,059 | Safford | May 25, 1948 |

OTHER REFERENCES

Dow Corning Silicone Note Book 3, "D. C. 200," September 1948, pages 3, 11 to 15 and 28.